United States Patent
Cumming et al.

(10) Patent No.: US 9,418,076 B2
(45) Date of Patent: Aug. 16, 2016

(54) SYSTEM AND METHOD FOR DETERMINING INTERESTS FROM LOCATION DATA

(71) Applicant: BlackBerry Limited, Waterloo (CA)

(72) Inventors: Joel George Cumming, Waterloo (CA); Shaohua Zhang, Mississauga (CA)

(73) Assignee: BlackBerry Limited, Waterloo, Ontario (CA)

( * ) Notice: Subject to any disclaimer, the term of this patent is extended or adjusted under 35 U.S.C. 154(b) by 226 days.

(21) Appl. No.: 14/169,398

(22) Filed: Jan. 31, 2014

(65) Prior Publication Data

US 2015/0220566 A1  Aug. 6, 2015

(51) Int. Cl.

| | |
|---|---|
| *G06F 17/30* | (2006.01) |
| *G06Q 30/02* | (2012.01) |
| *H04L 29/08* | (2006.01) |
| *H04W 4/02* | (2009.01) |
| *G06Q 50/00* | (2012.01) |

(52) U.S. Cl.
CPC ...... *G06F 17/30241* (2013.01); *G06F 17/3097* (2013.01); *G06F 17/30705* (2013.01); *G06F 17/30867* (2013.01); *G06F 17/30876* (2013.01); *G06Q 30/0205* (2013.01); *G06Q 30/0251* (2013.01); *G06Q 50/01* (2013.01); *H04L 67/02* (2013.01); *H04L 67/10* (2013.01); *H04W 4/025* (2013.01)

(58) Field of Classification Search
CPC ........................ G06Q 30/0205; G06Q 30/0251
See application file for complete search history.

(56) References Cited

U.S. PATENT DOCUMENTS

| 7,440,968 | B1 * | 10/2008 | Oztekin | G06F 17/30864 |
|---|---|---|---|---|
| 7,849,082 | B2 * | 12/2010 | Westphal | G06F 17/3087 |
| | | | | 707/731 |
| 8,369,263 | B2 * | 2/2013 | Dowling | H04L 12/1859 |
| | | | | 370/328 |
| 2007/0161382 | A1 | 7/2007 | Melinger et al. | |
| 2009/0006336 | A1 | 1/2009 | Forstall et al. | |
| 2009/0006974 | A1 * | 1/2009 | Harinarayan | G06F 17/30867 |
| | | | | 715/738 |

(Continued)

FOREIGN PATENT DOCUMENTS

| WO | 2008054671 | 5/2008 |
|---|---|---|
| WO | 2009021265 | 2/2009 |

(Continued)

OTHER PUBLICATIONS

Zheng, Yu, Xing Xie, and Wei-Ying Ma. "GeoLife: A Collaborative Social Networking Service among User, Location and Trajectory." IEEE Data Eng. Bull. 33.2 (2010): 32-39.*

(Continued)

*Primary Examiner* — William Spieler
(74) *Attorney, Agent, or Firm* — Thomas Grzesik; Fleit Gibbons Gutman Bongini & Bianco P.L.

(57) ABSTRACT

A system and method are provided, for example, for determining interests from location data, by receiving location data from a mobile device, using the location data to determine a uniform resource locator associated with a point of interest, determining classification data associated with the uniform resource locator, and updating an interest graph associated with the mobile device using the classification data. The updated interest graph may also be subsequently used and the classification data may be used to provide information to the mobile device in real-time, such as recommendations or suggestions.

20 Claims, 10 Drawing Sheets

(56) References Cited

U.S. PATENT DOCUMENTS

| | | | |
|---|---|---|---|
| 2009/0171939 A1 | 7/2009 | Athsani et al. | |
| 2009/0198767 A1* | 8/2009 | Jakobson | G01C 21/3679 709/203 |
| 2010/0082659 A1* | 4/2010 | Reddy | G06F 17/30867 707/767 |
| 2011/0060808 A1* | 3/2011 | Martin | G06F 17/3087 709/217 |
| 2011/0238301 A1 | 9/2011 | Lee et al. | |
| 2013/0325329 A1 | 12/2013 | Gupta et al. | |
| 2014/0018105 A1 | 1/2014 | O'Neil et al. | |

FOREIGN PATENT DOCUMENTS

| | | |
|---|---|---|
| WO | 2009079407 | 6/2009 |
| WO | 2013182745 | 12/2013 |

OTHER PUBLICATIONS

European Search Report dated Mar. 30, 2015, for European Application No. 15152996.3.

* cited by examiner

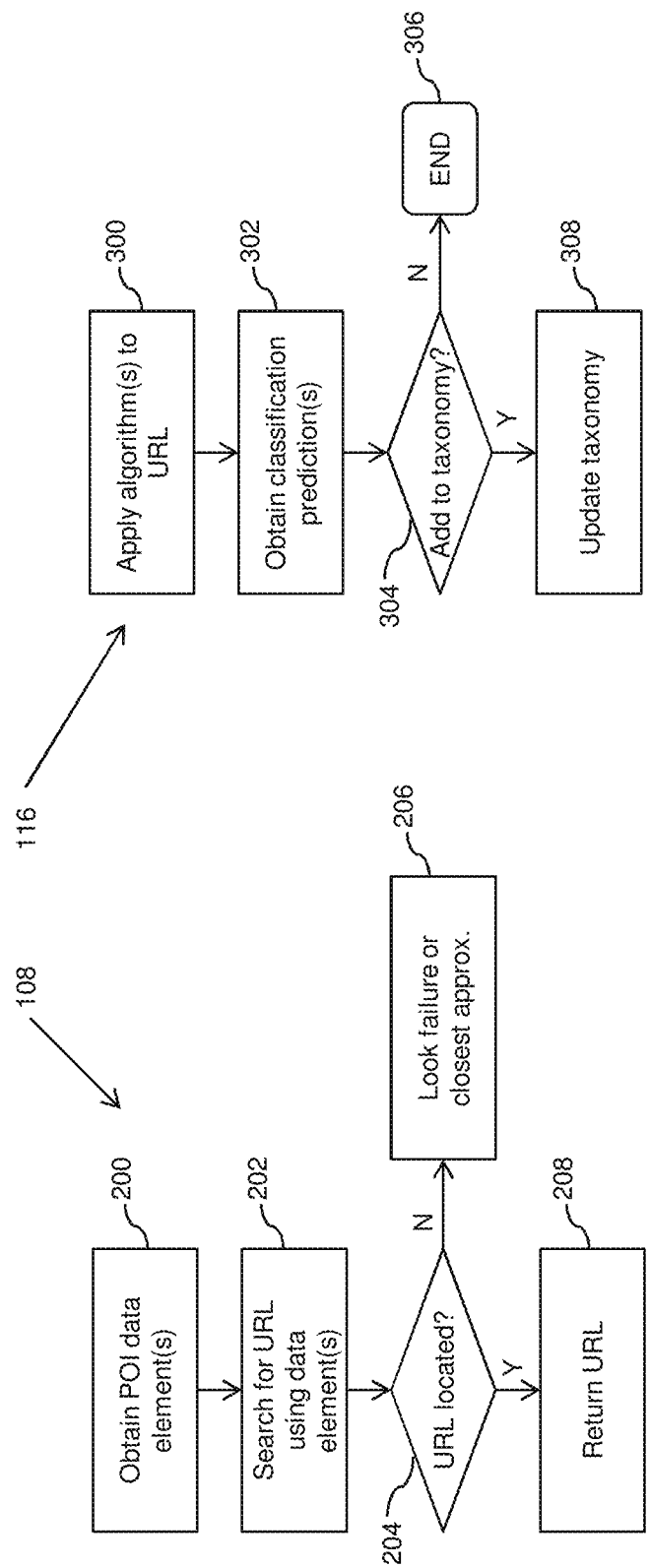

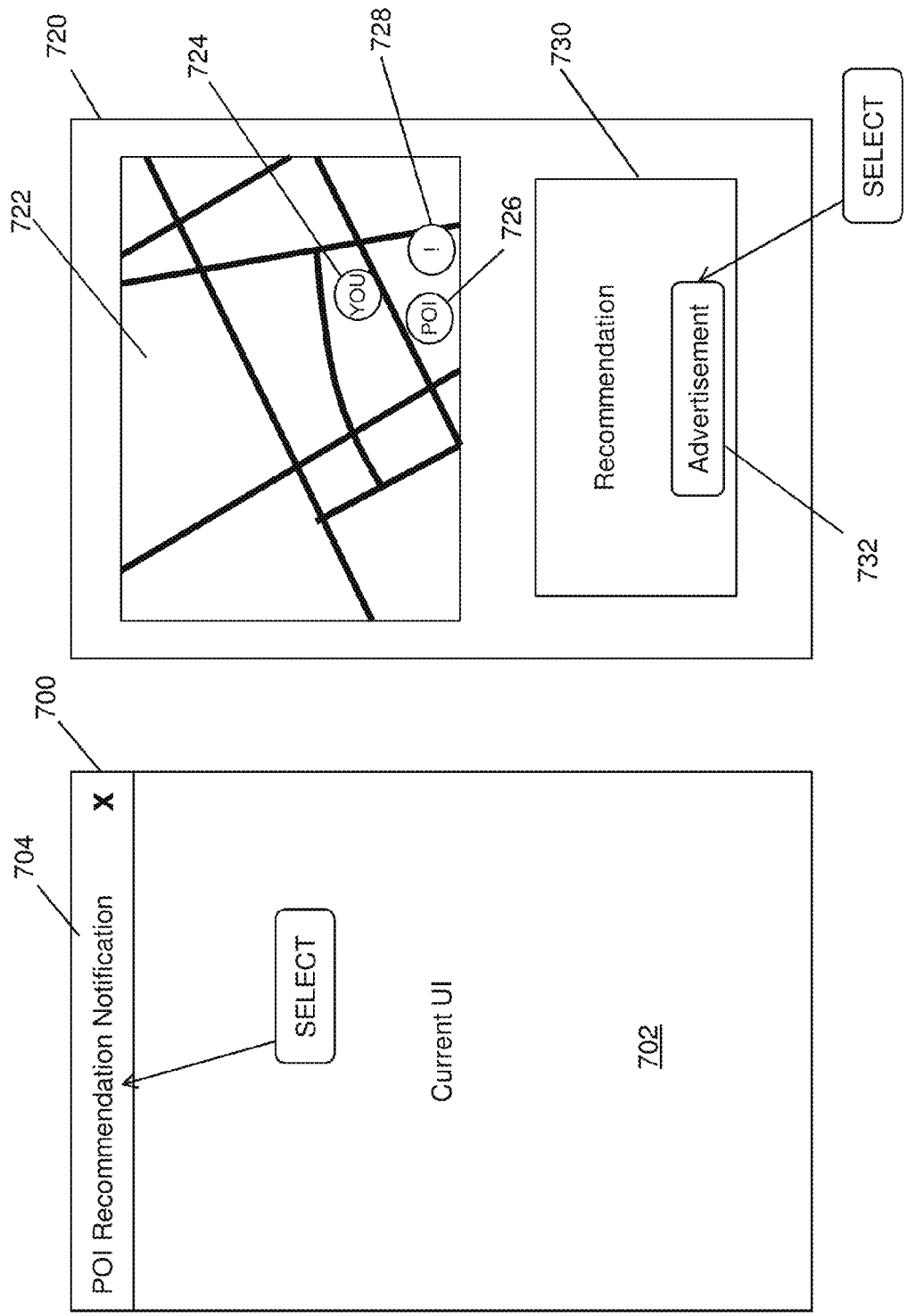

SYSTEM AND METHOD FOR DETERMINING INTERESTS FROM LOCATION DATA

TECHNICAL FIELD

The following relates to systems and methods for determining interests from location data.

DESCRIPTION OF THE RELATED ART

Many service providers for users of personal electronic communication devices are building interest graphs to understand and adapt to their customers, in order to provide increasing levels of personalization. An interest graph is a representation of various specific things in which an individual is interested. Such interest graphs are being used as indicators of potential user interests and behaviors, e.g., what a user will do or buy, where they may wish to go, who they may wish to connect with (virtually and/or socially), etc.

BRIEF DESCRIPTION OF THE DRAWINGS

Embodiments will now be described by way of example with reference to the appended drawings wherein:

FIG. 8 is a flow chart illustrating an example set of computer executable operations performed in determining a URL from point of interest (POI) data elements in a POI database;

FIG. 9 is a flow chart illustrating an example set of computer executable operations performed in generating a classification prediction for a URL not found in a taxonomy database;

FIG. 13 is a screen shot of an example of a user interface displaying an incoming notification associated with a recommendation provided by an interest graph service;

FIG. 14 is a screen shot of an example of a user interface for displaying information associated with a recommendation provided by an interest graph service.

DETAILED DESCRIPTION

Figure 1:
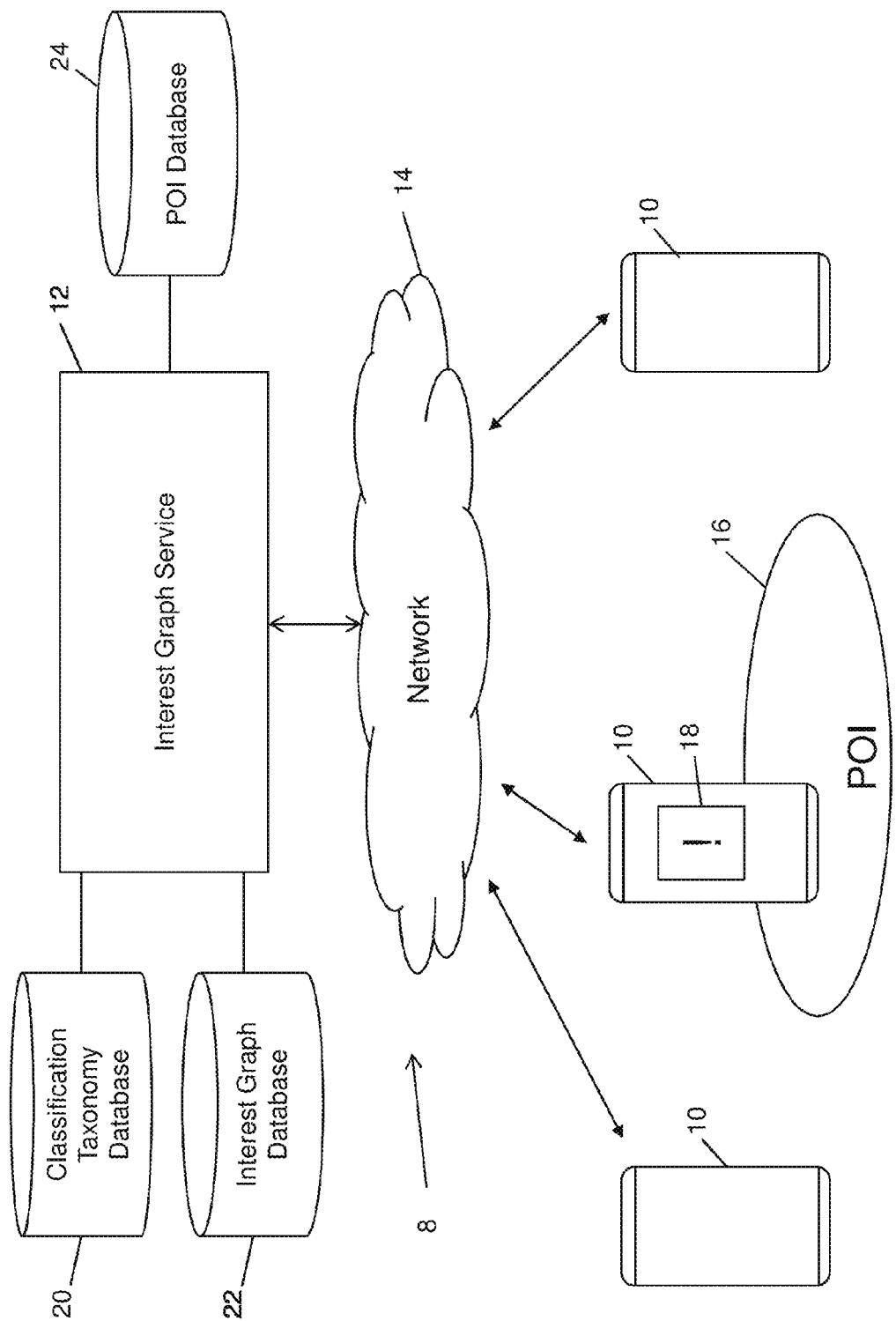
FIG. 1 is a schematic diagram of an example of a system for generating interest graphs using location data obtained from mobile devices.

For simplicity and clarity of illustration, where considered appropriate, reference numerals may be repeated among the figures to indicate corresponding or analogous elements. In addition, numerous specific details are set forth in order to provide a thorough understanding of the examples described herein. However, it will be understood by those of ordinary skill in the art that the examples described herein may be practiced without these specific details. In other instances, well-known methods, procedures and components have not been described in detail so as not to obscure the examples described herein. Also, the description is not to be considered as limiting the scope of the examples described herein.

It will be appreciated that the examples and corresponding diagrams used herein are for illustrative purposes only. Different configurations and terminology can be used without departing from the principles expressed herein. For instance, components and modules can be added, deleted, modified, or arranged with differing connections without departing from these principles.

Interest graphs can be built from observing various interactions that a user has with his/her environment using one or more communication devices, as well as from self-declared attributes and preferences. These observed and self-declared data may then be used to develop user profiles and affinities, which can be used in many applications such as advertising, application suggestions, etc.

An interest graph is a graphical, electronic representation of a network of an individual's interests. Typically, such an interest graph includes vertices or nodes that represent entities and edges between such vertices or nodes represent an interest between entities. For example, an individual connected by an edge to a node representing a type of restaurant represents an interest of that individual in that type of restaurant.

While location data is typically very useful in observing interests and preferences, tying a geographic coordinate to an interest or "taste" signal can be challenging. In order to leverage location data in generating interest graphs for mobile communication device users, it has been found that location-based interest signal derivation can be achieved by obtaining a uniform resource locator (URL) for detected points of interest (POIs) and classifying the POI according to a taxonomy with which the URL is or can be associated. In this way, any location data can be used to both update interest graphs and make real time suggestions or recommendations by correlating the POI to a URL and using the URL to find classification information indicative of tastes, interests, preferences, etc.

There is provided a method of determining interests from location data, the method comprising: receiving location data from a mobile device; using the location data to determine a uniform resource locator associated with a point of interest; determining classification data associated with the uniform resource locator; and updating an interest graph associated with the mobile device using the classification data.

There is also provided a method comprising: receiving location data from a mobile device; using the location data to determine a uniform resource locator associated with a point of interest; determining classification data associated with the uniform resource locator; and using the classification data to provide information to the mobile device in association with the point of interest.

There is also provided a method comprising: obtaining an interest graph having been generated by determining classification data associated with a uniform resource locator, the uniform resource locator being associated with a point of interest determined from location data provided by a mobile device; using the interest graph to determine a recommendation or suggestion; and providing the recommendation or suggestion to the mobile device.

There is also provided a method performed by a mobile device comprising: receiving information in association with a point of interest associated with the mobile device, the information based on classification data associated with a uniform resource locator, the uniform resource locator being associated with a point of interest determined from location data provided by the mobile device; and displaying the information.

There are also provided devices, services, and computer readable media comprising computer executable instructions for performing such methods.

Turning now to FIG. 1, a communication system 8 is shown in which one or more mobile electronic communication devices 10 (referred to hereinafter as "mobile devices 10") are capable of communicating with, for example, a network infrastructure, various services, other communication devices, etc., via one or more networks 14. It can be appreciated that the number of devices and network 14 shown in FIG. 1 are purely illustrative and various components within the system 8 are omitted for the sake of simplicity. In the example shown in FIG. 1, an interest graph service 12 is configured within the network infrastructure or otherwise capable of observing the nature of communications and activities associated with various mobile devices 10 in order to build, maintain, and use interest graphs associated with users of the mobile devices 10. For example, as shown in FIG. 1, by allowing location data to be shared, a particular one of the mobile devices 10 can be detected to be at or near a point of interest (POI) 16 in a real-world environment. As illustrated, being in or near such a POI 16 can cause an alert, notification, recommendation, suggestion or other action to be taken on the mobile device 10.

In FIG. 1, an alert 18 is being displayed on the mobile device 10 at or near the POI 16. It can be appreciated that the alert 18 may comprise any pertinent or useful information that the interest graph service 12 determines to be relevant to the associated user and/or mobile device 10, e.g. a recommendation for a merchant or restaurant in or near the POI 16 according to taste or interest signals determined from a taste graph for the user. As discussed in greater detail below, the interest graph service 12 can use the location data to identify the POI 16 and determine a URL associated with the POI 16. The URL is then used to determine classification data (e.g., categories, types, etc.) according to one or more taxonomies, in order to create an interest graph or update an existing interest graph for a user associated with the mobile device 10 (or the device itself).

As also shown in FIG. 1, the interest graph service 12 includes or otherwise has access to an interest graph database 22, which may include one or more interest graphs for users associated with the system 8 (e.g. subscribers). The interest graph service 12 also includes or otherwise has access to a classification taxonomy database 20 for URLs, which includes classification data such as categories under which URLs have been classified. For example, the classification taxonomy database 20 may comprise or be built using or from an open directory project (ODP) used to classify URLs on the internet. The interest graph service 12 also includes or otherwise has access to a POI database 24, which includes one or more POIs and associated information and/or attributes such as addresses, names, and URLs. The POI database 24 can be built from any one or more proprietary or open POI collections, such as those available from Infogroup™, Open Street Map™, Factual™, Foursquare™, etc.; and used to identify a URL with a POI 16 in or near where a mobile device 10 is located.

It can be appreciated that although FIG. 1 illustrates mobile devices 10 (e.g., personal, handheld devices such as smartphones, tablets, phablets, personal gaming devices, etc.) being observed by the interest graph service 12, the principles discussed herein apply to any electronic device capable of providing location information, whether or not that device is normally used for or otherwise capable of communicating with other devices. For example, a vehicle having a global positioning system (GPS) and network access could be tracked by the interest graph service 12 and have information sent thereto.

Figure 2:
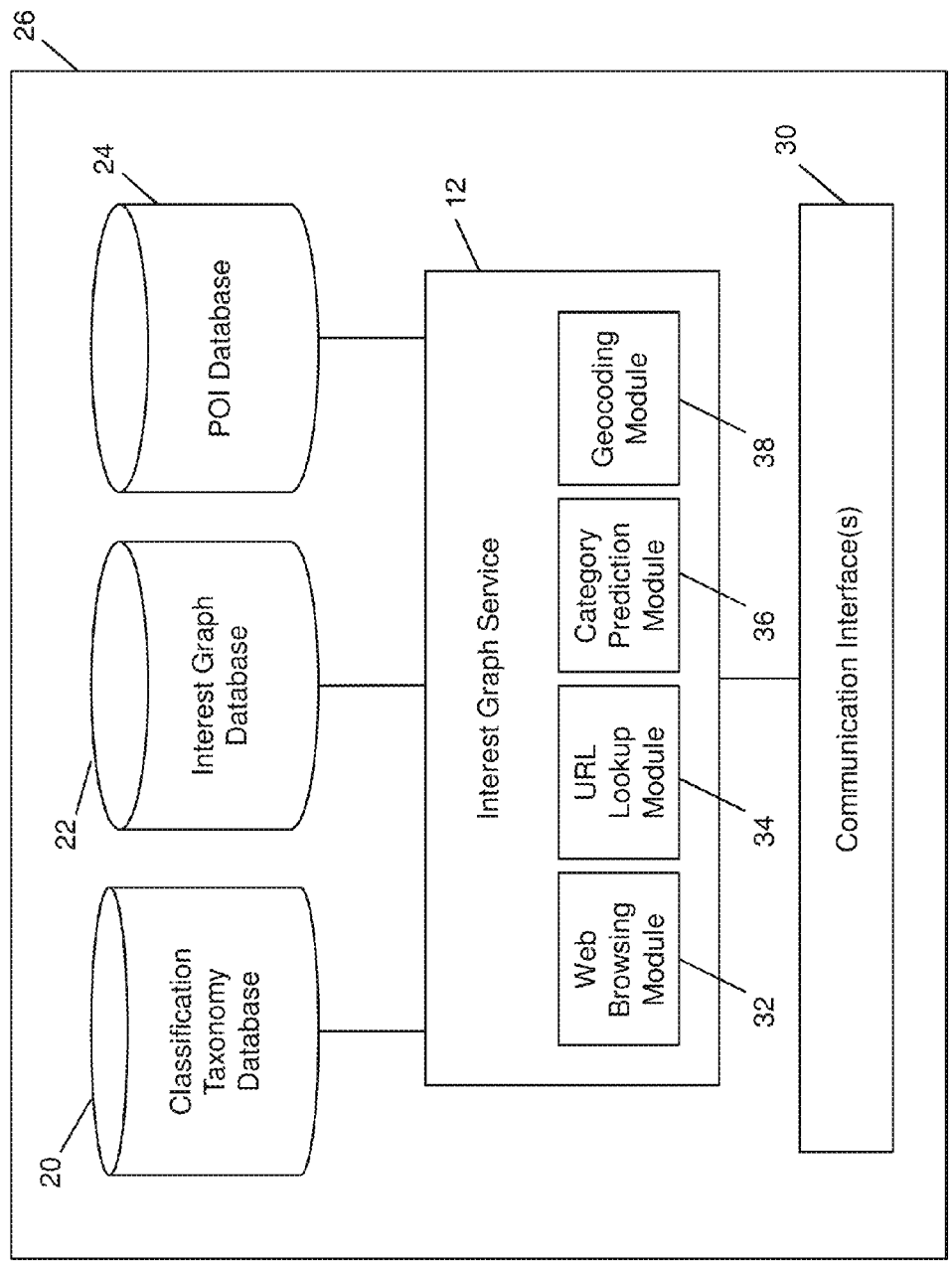
FIG. 2 is a block diagram of an example of a configuration for a server device providing an interest graph service.

FIG. 2 illustrates an example of a configuration for a server 26 or other network system component that operates, includes or hosts the interest graph service 12 and includes or otherwise has access to the classification taxonomy database 20, the interest graph database 22, and the POI database 24. In the example shown in FIG. 2, the interest graph service 12 is capable of accessing the network 14 via one or more communication interfaces 30 provided by the server 26.

The interest graph service 12 includes a web browsing module 32 for performing searches for information such as URLs. The web browsing module 32 may conduct such searching by accessing an online search engine via the network 14 and a communication interface 30. The interest graph service 12 also includes a URL lookup module 34 that can be used to find a URL in the POI database 24 based on location information (or a derivation of such location information) provided by a mobile device 10. For example, a latitude/longitude pair sent by the mobile device 10 to the interest graph service 12 may be reverse geocoded to determine a POI in the POI database 24. It can be appreciated that the POI database 24 can include various information for each POI entry. By having URLs associated with the POI entries, the URLs can be located and associated with a mobile device's current location. The URL lookup module 34 may also utilize or otherwise communicate with the web browsing module 32 to initiate a search for a URL that is not mapped to a POI 16 in the POI database 24. For example, an address in the POI database 24 may be used to search for a URL concerning the business or landmark at that POI.

The interest graph service 12 also includes a category prediction module 36, which may be used to classify an unclassified URL that is associated with a POI 16. For example, a URL that is found in the POI database 24 may not yet have been mapped to a classification taxonomy in the classification taxonomy database 20. In such a situation, one or more prediction algorithms, e.g. using machine learning (such as a Naïve Bays n-gram approach, etc.), can be applied to the URL to determine into which category(ies) the URL falls based on training data. For example, URL classification can be performed by accessing external knowledge database and using such knowledge databases as training data. Databases such as Wikipedia, Freebase, and Open Directory Project (ODP) typically include large numbers of entities/categories with associated URLs. Statistical language models can be trained on the data points provided by these databases and the models used to classify new URLs into categories. The interest graph service 12 also includes a geocoding module 38 for decoding or normalizing location data obtained from a mobile device 10 into information that can be referenced in the POI database 24. For example, a latitude/longitude pair reported by a mobile device 10 can be processed by the geocoding module 38 to determine an address that can be searched in the POI database 24.

The modules shown in FIG. 2 are illustrative only and are delineated from each other only for the purpose of illustration. For example, the interest graph service 12 could instead include any one or more applications programmed or otherwise configured to collectively perform the functions of the modules exemplified herein. Similarly any one or more applications programmed to perform any one or more of the functions of these modules may be utilized by the interest graph service 12.

Figure 3:
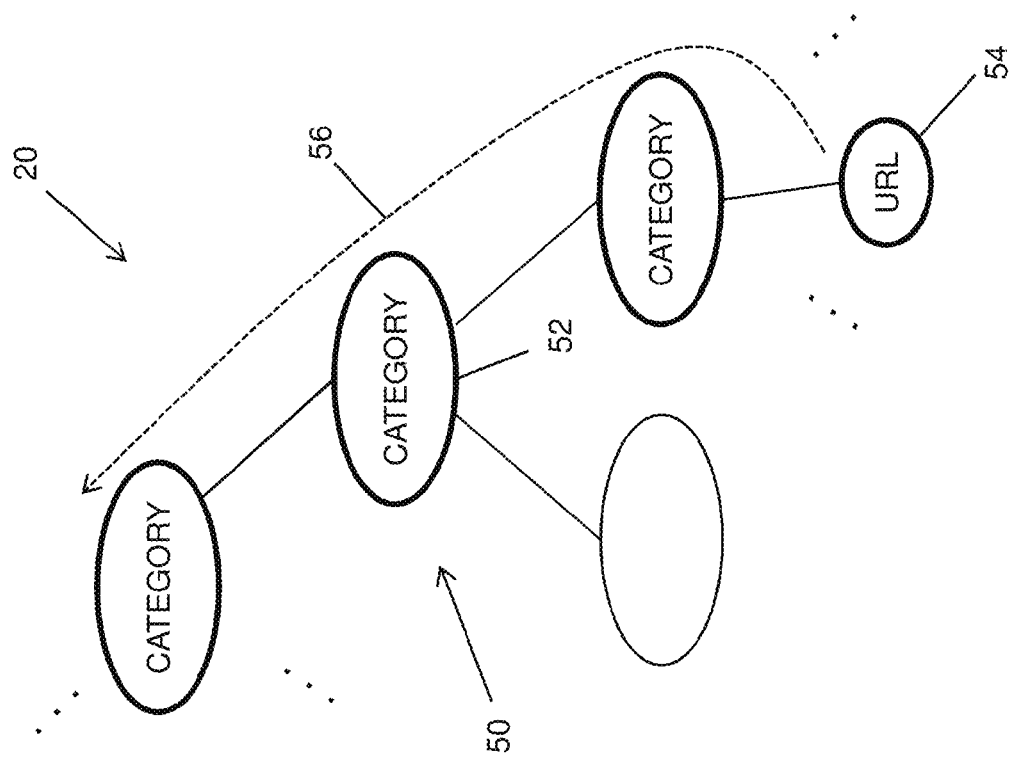
FIG. 3 is a schematic diagram of an example of a uniform resource locator (URL) classification tree.

A schematic illustration of data that may be stored in the classification taxonomy database 20 is shown in FIG. 3. In the example shown in FIG. 3, a hierarchical tree 50 of categories 52 is utilized to classify URLs 54 at the leaf nodes. By storing classification data in this way, a search for a URL 54 in the tree 50 can be used to identify a taxonomy for that URL 54, based on the nodes traversed in a path 56 back up to the root node. For example, the URL 54 for a family-oriented chain restaurant may be classified as: BUSINESS/HOSPITALITY/RESTAURANT CHAINS/FAMILY. These categories 52 that are associated with the URL 54 provide information that can be used to update an interest graph for a user, particularly when coupled with other data such as frequency, time of day, day of week, etc.

User interest signals may be harvested from multiple heterogeneous data sources. User behaviors such as mobile search, web browsing, social network profile updates, passive/explicit check-ins at a POI, and on-device application usage may all reflect a user's real-life interests and can therefore contribute to a user-interest affinity calculation. Central to such a calculation is a taste or interest taxonomy that connects the heterogeneous signals. For example, compared to a user who has passively checked in at FAMILY Restaurant X twice in the past month, another user who has checked in at Restaurant X only once, but also "liked" Restaurant Y (also a family-style restaurant), and looked up menus at family Restaurant Z via a mobile browser would be assumed to have a stronger affinity to FAMILY style restaurants. As such, when data is sparse, a structured taxonomy allows user interest modeling accuracy to be improved. Also, when data is not sparse, the taxonomy can also be used in conjunction with other data driven associative graphs for user interest modeling. Accordingly, apart from frequency, time of day, etc., user interests can be inferred by looking for correlations from leaf nodes of a taxonomy to other leaf nodes. In the above example, once correlations are seen for "family restaurants" to other tastes, inferences can be spread about users into other areas. For example, users who like family restaurants may be more likely to prefer certain hotel chains or large rental cars. Scores attributed to the tastes would decay across each node that is traversed (e.g., users preferring hotel X also prefer store X would have a decayed affinity propagated to store X). Once the inferred tastes are propagated to other areas, a bottom up propagation can be provided, which fills in the higher level tastes (e.g., travel, shopping, etc.).

Figure 4:
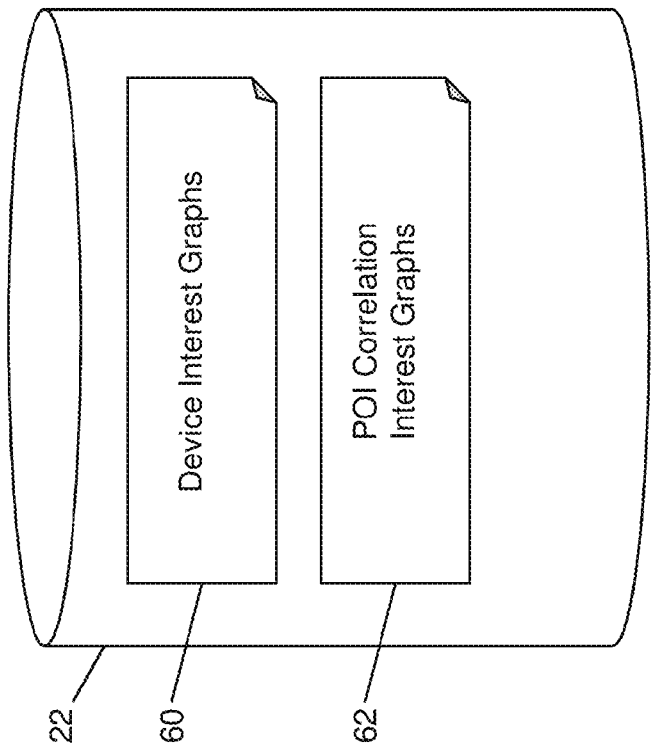
FIG. 4 is a schematic diagram of an example of a configuration for an interest graph database.

FIG. 4 illustrates an example of an interest graph database 22, which includes device interest graphs 60, and POI correlation interest graphs 62. The device interest graphs 60 are associated with behaviors, actions, and interactions of a particular mobile device 10 and the one or more users associated with that mobile device 10. In addition to building interest graphs 60 for users, it has been found that interest graphs can also be built around a POI 16 to allow correlations to be made and used in providing suggestions and/or recommendations to users of mobile devices 10. It has also been found that interest taxonomies can be considered a semantic layer which connects different URL/POI entities so that Restaurant X can be recommended to users who have in the past shown interest in family style restaurants. Another example is that skydiving events could be recommended to users who have shown in the past to have an interest in extreme sports such as bungie jumping or climbing, which are also considered extreme sports. When a knowledge base or taxonomy does not capture all URLs or POIs that could be considered by the system 8, data driven correlation can also be used to make recommendations. For example, users who have liked bungie jumping pages may also tend to visit skydiving equipment webpages more often than others. For an individual user, the system 8 can also find users who are similar to them in terms of interests and make recommendations based on "people you like" and recommend POIs or URLs that "people like you" like. The recommendations that are provided may therefore come from a combination of several different approaches, and the data being relied on can be contextualized, e.g. to avoid targeting users with coupons for Restaurant X in locations where that restaurant does not have a presence.

Figure 5:
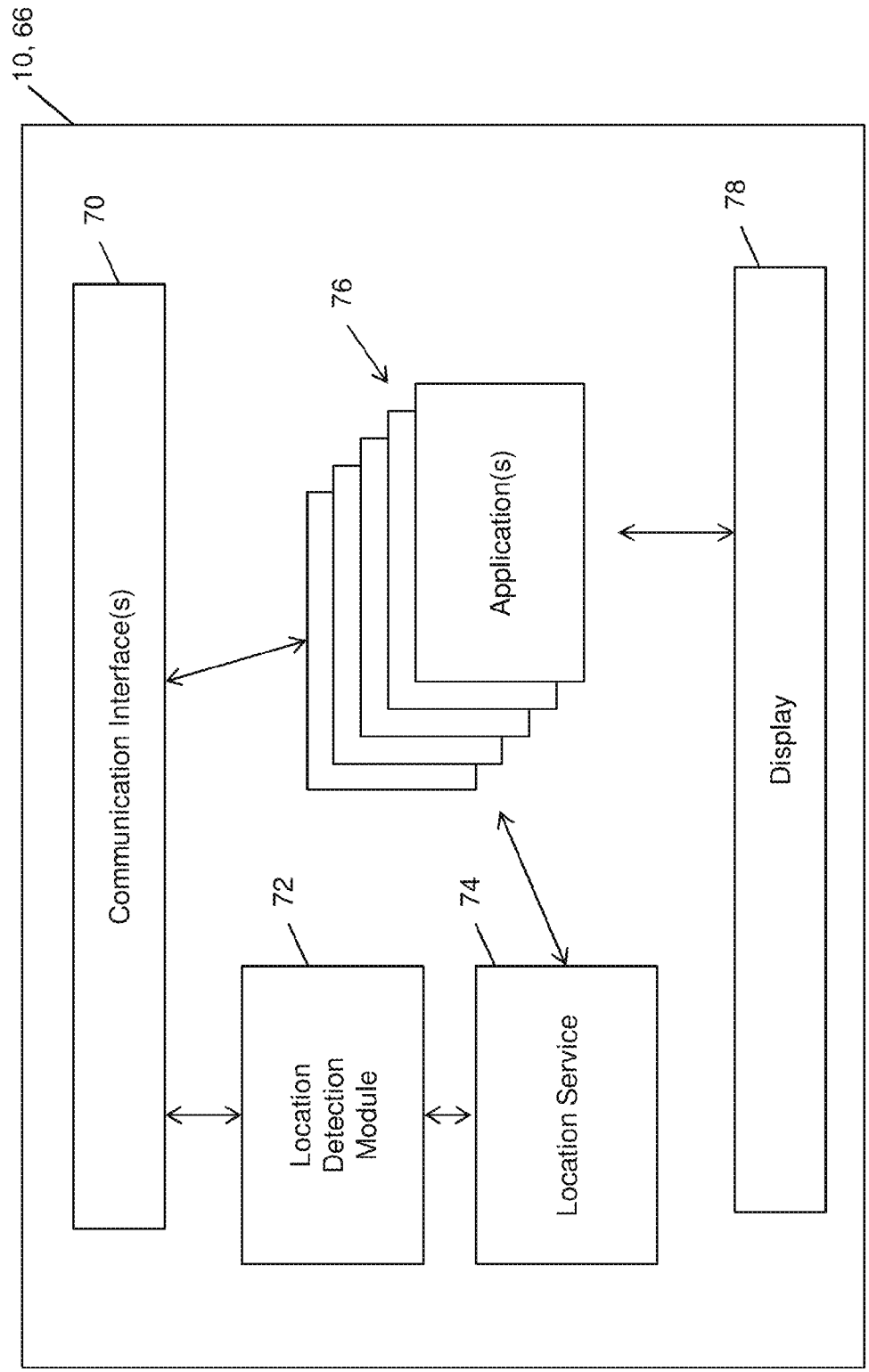
FIG. 5 is a block diagram of an example of a configuration for an electronic communication device having a location service.

FIG. 5 illustrates an example of a configuration for a mobile device 10 (e.g. as shown in FIG. 1) or any other electronic device 66 programmed or otherwise operable to participate in the system 8. The device 10, 66 includes one or more communication interfaces 70 to enable at least a location detection module 72 capable of obtaining location data for the device 10, 66 to communicate such data to the interest graph service 12. The location determination may be based on outdoor and/or indoor position determining technologies/systems. The device 10, 66 may also have one or more applications 76. These applications 76 may utilize a location service 74 on the device 10, 66 to provide location data to the application 76. It can be appreciated that any one or more of the location detection module 72, location service 74, and applications 76 can be configured to communicate with the interest graph service 12. As such, the configuration shown in FIG. 5 is for illustrative purposes only. The device 10, 66 may also include a display 78 and/or other input/output device for providing notifications, alerts, recommendations, suggestions, etc. to the user of the device 10, 66. For example, the display 78 may be used by an application 76 to display a recommendation to be displayed in a user interface based on the location of the device 10, 66.

Figure 6:
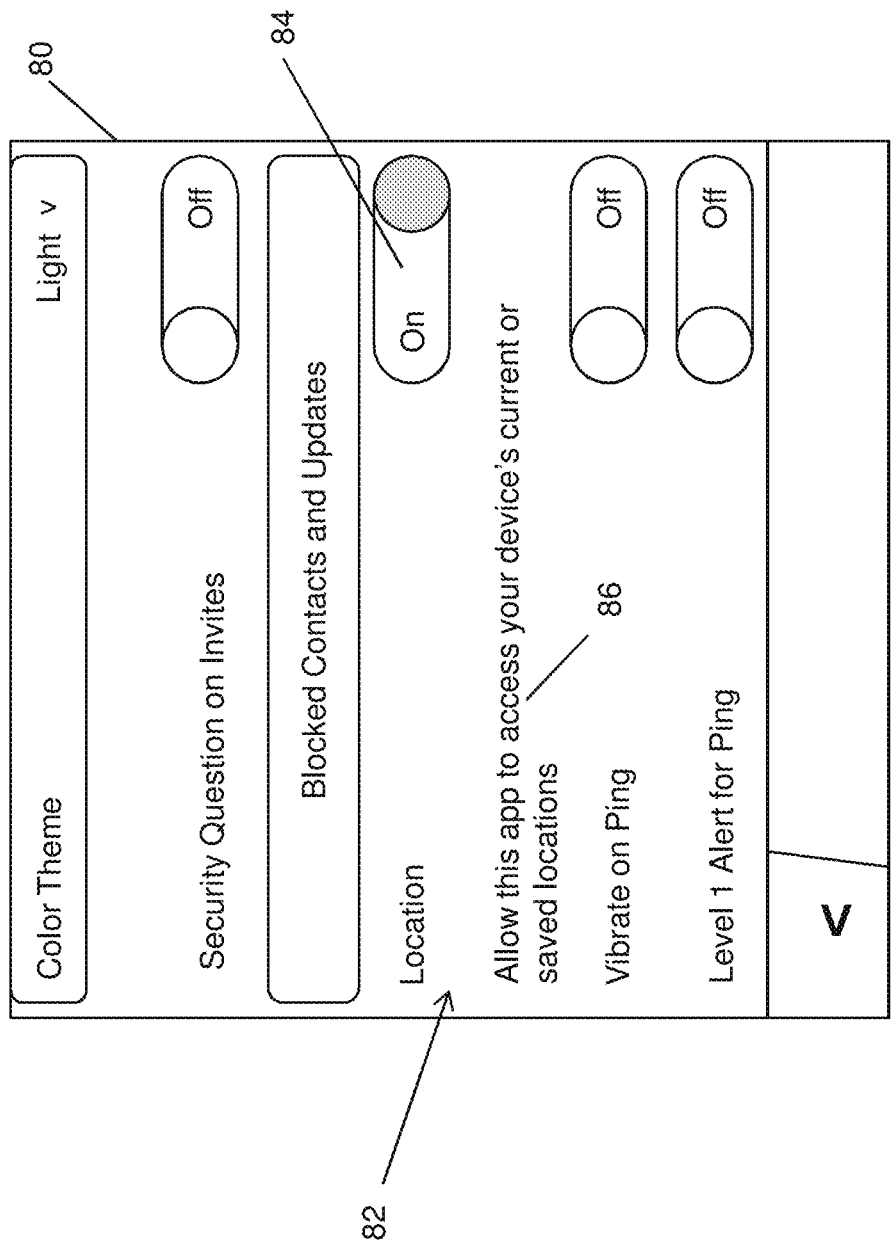
FIG. 6 is a screen shot of an example of a user interface for controlling use of a location service.

FIG. 6 illustrates a screen shot of an example of a profile user interface 80, which includes a location services option 82. By toggling the on/off soft switch 84 to the "ON" position as shown in FIG. 6, the application 76 to which the profile user interface 80 belongs is given permission to access the device's current or saved locations. The use of location data in the way described herein may therefore be a user-selectable option in any one or more application 76 or at a device level (not shown).

Figure 7:
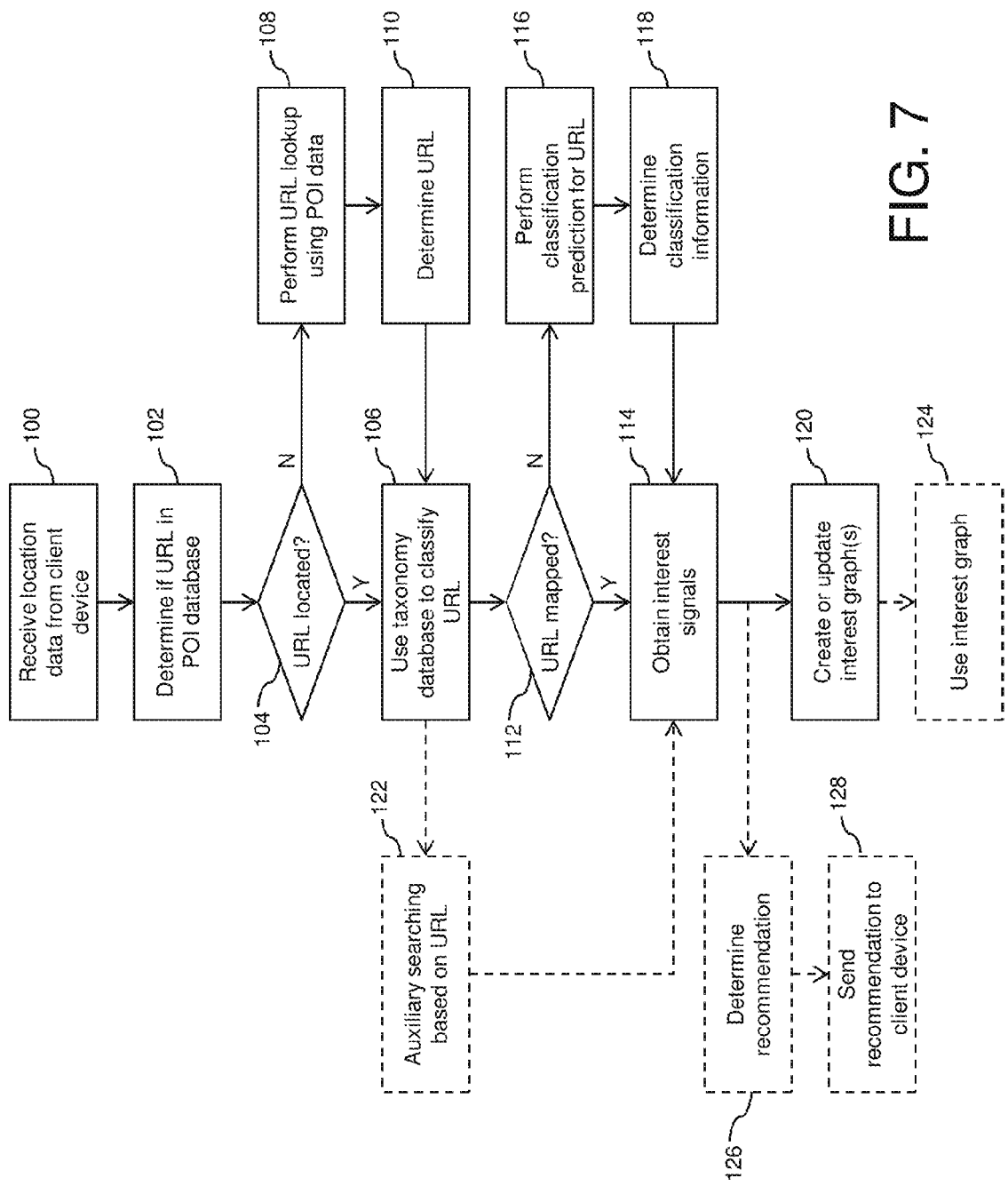
FIG. 7 is a flow chart illustrating an example set of computer executable operations performed in updating an interest graph using location data received from a client device.

Turning now to FIG. 7, computer executable operations are illustrated that may be performed by the interest graph service 12 in updating an interest graph 60 using location data received from a client device such as the mobile device 10 shown in FIG. 1. At 100 the interest graph service 12 receives location data (e.g. latitude/longitude pair) from the mobile device 10. The mobile device 10 may also send additional information such as a timestamp associated with the location data, a degree of accuracy attributed to the location data sample, etc. The location data may be sent as a separate message or appended to another message or communication to the network infrastructure. It can be appreciated that various data delivery models could be used, for example a separate message that is sent using a battery-optimized method, e.g. every 6 hours when stationary, and every 15 minutes when the device 10 has moved more than a predetermined distance.

The interest graph service 12 determines at 102 if there is a URL 54 that can be identified in the POI database 24. Where to look in the POI database 24 can be determined in a number of ways. For example, the location data may itself be directly locatable from the POI database 24 (i.e. for example, if POI entries contain the same format of the location data as what is reported). The location data may instead require conversion, formatting or normalization in order to be able to correlate the location data to an entry in the POI database 24. Moreover, the location data may directly identify the POI 16, e.g. if the POI 16 is being self-reported by a user of the mobile device 10. For example, an application 76 may prompt the user to identify the POI 16, which can be sent to the interest graph service 12 to locate an associate URL 54. The interest graph service 12 determines at 104 whether or not a URL 54 can be found for the POI 16. If so, the interest graph service 12 can use the URL 54 at 106 to locate a classification taxonomy for the URL 54, if one can be found by the interest graph service 12. If a URL 54 cannot be found in the POI database 24, the interest graph service 12 performs a URL lookup at 108 using, for example, POI data from the POI database 24. For example, an address in the POI database 24 can be used to perform an external search query to identify a place of business or landmark at the POI 16. In this example, it is assumed that a URL 54 can be found and that URL 54 is determined at 110 and used to find an associated classification taxonomy at 106.

The interest graph service 12 determines at 112 whether or not the URL 54 can be mapped to a classification taxonomy. If so, interest signals (e.g. a series and/or hierarchy of categories) are obtained that are associated with the URL 54 at 114. If the URL 54 has not yet been classified by the interest graph service 12, a classification prediction for the URL 54 can be performed by the interest graph service 12 at 116 in order to determine classification information at 118 that can be used to derive interest signals at 114. Also shown in FIG. 7 is an optional operation at 122 to perform auxiliary searching based on the URL 54. For example, a URL 54 associated with a concert venue could trigger an auxiliary search to be performed for a performer playing at the time the user was observed at the concert venue POI 16. In this way, additional interest signals can be derived and added to supplement interest signals associated with the actual URL 54 for the POI 16. For example, taking an additional step to locate an event occurring at the POI venue can be classified as an interest (e.g. a sports or music taste).

The interest signals that are ultimately obtained at 114 are then used to update and/or create at least one interest graph 60 associated with the mobile device 10 at 120. As indicated in FIG. 7, other interest graphs may also be updated based on the interest signals, for example, a POI interest graph 62 to reflect demographic or other statistical indications. The interest graph thus updated may subsequently be used at 124, e.g., for providing targeted advertising, application download recommendations, content recommendations, etc.

The classification taxonomy associated with the URL 54 and POI 16, as well as any other information obtained during the process shown in FIG. 7 can also be used in real-time to determine a suggestion or recommendation for the mobile device 10 at 126. For example, if the POI 16 is a shopping plaza, in addition to updating a user's interest graph based on being at that POI 16 at that time, the interest graph service 12 can also determine that this is an appropriate time to make a restaurant suggestion by sending a recommendation to the mobile device 10 at 128. Such a suggestion can be made based only on what is available at the shopping plaza or additionally can factor in interest signals derived from the user's existing interest graph 60. In other words, in addition to obtaining interest signals to enhance and update the user's interest graph 60, the interest graph service 12 can also opportunistically feedback appropriate information to the user of the mobile device 10.

In another example, the interest signals obtained at 114 may be associated with a device 10 that does not have an existing interest graph 60. This situation, sometimes referred to as a "cold start", can still be taken advantage of to provide a recommendation. For example, the user can be presented with a series of dining options in the shopping plaza, or could be provided with coffee shop suggestions if the timestamp indicates mid-morning or mid-afternoon. Subsequent location data indicative of whether or not the user selected one of the recommendations can also be determined from subsequent location reporting. As such, the interest signals obtained at 114 based on a URL 54 associated with location data can also be used for real-time recommendations, suggestions, or the provision of other relevant information independently of the building and maintenance of interest graphs 60.

It can be appreciated that alternative service configurations are possible to accommodate user preferences wherein the user does not permit the collection of data for maintaining an interest graph 60 (i.e. opts out of having an interest graph 60), but where that user does allow impersonal recommendations or suggestions to be made based on real-time location.

Turning now to FIG. 8, computer executable operations are illustrated that may be performed by the interest graph service 12 in performing a URL lookup at 108 in FIG. 7. At 200, the interest graph service 12 uses the URL lookup module 34 to obtain the POI data elements available in the POI database 24, and searches for relevant URLs at 202 using the data elements. For example, an address query may locate a business at the POI address, which has a URL for the company's website. The interest graph service 12 determines at 204 whether or not a suitable or relevant URL 54 can be found. If not, a lookup failure, closest approximation, or other feedback can be provided at 206. If a suitable URL 54 can be found, that URL 54 is returned at 208 to be used at 110 in FIG. 7.

In FIG. 9 example computer executable operations are illustrated that may be performed by the interest graph service 12 in performing a classification prediction for a URL 54 at 116 in FIG. 7. At 300, the interest graph service 12 uses the category prediction module 36 to apply one or more algorithms to the URL 54 and any available metadata to obtain a set of one or more classification predictions at 302. Based on the results of these analytics, the interest graph service 12 determines at 304 whether or not the URL 54 and/or any new categories or information can be added to the existing taxonomy. If not, the process ends at 306. If so, the existing taxonomy is updated at 308. One example method for approaching URL classification is by using a statistical language model trained on external training data. When such an approach falls short, further URL content can be scraped and topic models built to classify a URL into topic groups. A combination or ensemble of different models may also be used. User activity on a device 10 before and after a URL visit can also contribute to contextual information. For example, a keyword search before a URL visit may provide an explicit intent to search for something and therefore serves as context for the URL classification. Also, in some cases, a user's social connections and activities can be used to improve a URL classification.

Figure 10:
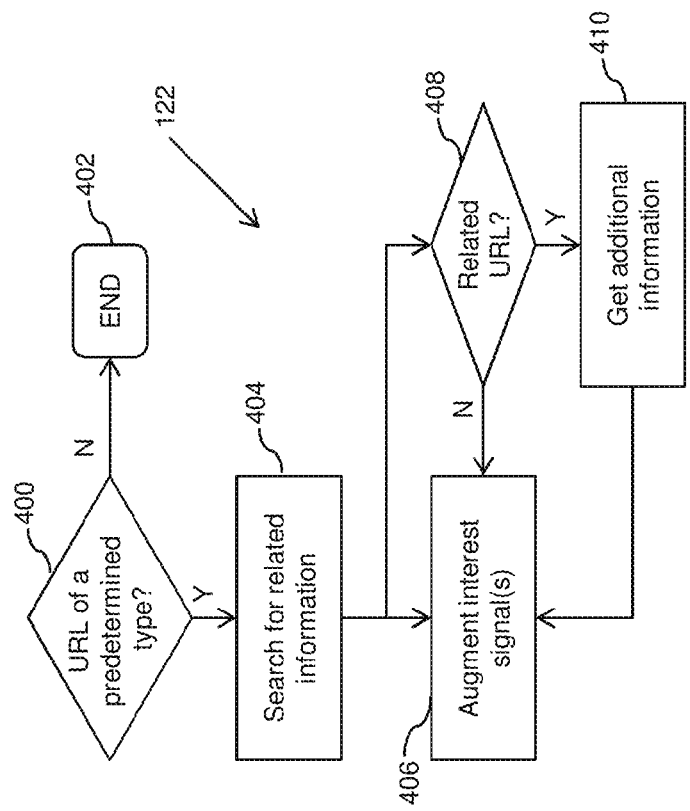
FIG. 10 is a flow chart illustrating an example set of computer executable operations performed in obtaining additional information related to a determined URL.

In FIG. 10, computer executable operations are illustrated that may be performed by the interest graph service 12 in obtaining additional information based on a URL at 122 in FIG. 7. At 400, the interest graph service 12 determines if the URL 54 is of a predetermined type. For example, a predetermined type may include a performance venue which hosts performances which themselves may have associated URLs 54. If the URL 54 is not of a predetermined type, the process ends at 402. If it is of a predetermined type, the interest graph service 12 may use the web browsing module 32 to search for related information at 404 and augment the interest signals at 406 using this additional information. For example, as discussed above, a performer playing at a venue associated with the POI 16 can be used as the basis for further searching to determine tastes and interests for the user. As such, the interest graph service 12 may determine at 408 if there are any related URLs 54 found in the search at 404. If so, additional information associated with the related URL(s) 54 can be obtained at 410 to further augment the interest signals determined at 406.

Figure 11:
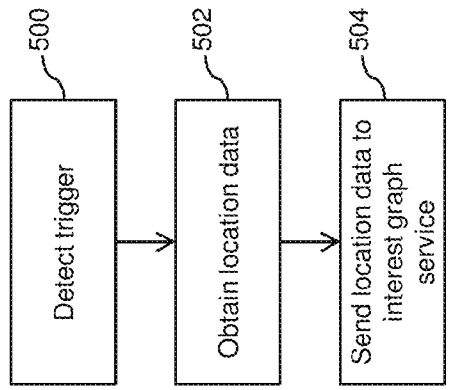
FIG. 11 is a flow chart illustrating an example set of computer executable operations performed by a location service on a mobile device in providing location data to an interest graph service.

Turning now to FIG. 11, computer executable operations are illustrated that may be performed by a "client device" such as the mobile device 10 shown in FIG. 1, in providing location data to the interest graph service 12. At 500 the mobile device 10 detects a trigger. The trigger can vary based on the application utilizing location services, user preferences, and various other factors. For example, the trigger may comprise a periodic time at which to report location data. The trigger may also comprise an active input from an application to begin reporting location data. The trigger could also be based on movement of the device, such as when the device has moved to a new location and/or held a relatively consistent position for a predetermined amount of time (e.g. which can be indicative of arriving at a POI 16). After detecting the trigger at 500, the mobile device 10 obtains the location data to be reported at 502 using the location service 74 and/or location detection module 72. The location data is then sent to the interest graph service 12 at 504.

Figure 12:
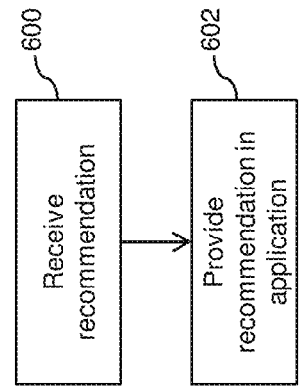
FIG. 12 is a flow chart illustrating an example set of computer executable operations performed in processing a recommendation provided by an interest graph service.

As discussed above, the mobile device 10 may also receive information from the interest graph service 12 in real time (or substantially real time) based on a current location, or at other times based on information provided by the interest graph 60 for the device 10. In FIG. 12, the mobile device 10 receives a recommendation at 600 from the interest graph service 12 and provides the recommendation in an application 76 at 602. For example, after reporting that the mobile device 10 is at or near (or proximate) a particular POI 16 having an associate URL 54, at least one relevant recommendation (e.g. advertisement and/or other media content in one or more respective formats, such as an image/picture format or video format) can be sent to the user.

FIG. 13 illustrates a screen shot 700 of a currently displayed user interface (UI) 702 at the time of receiving a recommendation or other data from the interest graph service 12. In the example shown in FIG. 13, a POI Recommendation Notification 704 is displayed to indicate that such a recommendation has been received. By selecting the notification as illustrated in FIG. 13, a screen shot 720 of a UI for presenting the recommendation 730 is displayed as shown in FIG. 14. The recommendation 730 may include a textual description and/or graphical image or animation (for example, a brand logo or other visual element). In this example, a map 722 is displayed along with the recommendation 730 and an advertisement 732 (for example, a coupon or offer). The map 722 includes a POI marker 726, a device marker 724, and an alert marker 728. The alert marker 728 may be used to mark a location within or near the POI 16 that is associated with the recommendation 730 and/or advertisement 732. For example, a recommendation regarding a suitable restaurant for lunch can be marked with the POI marker 726 and a coffee shop marked with the alert marker 728 based on an advertisement for an after-meal coffee (e.g. with coupon or promotional material).

Figure 15:
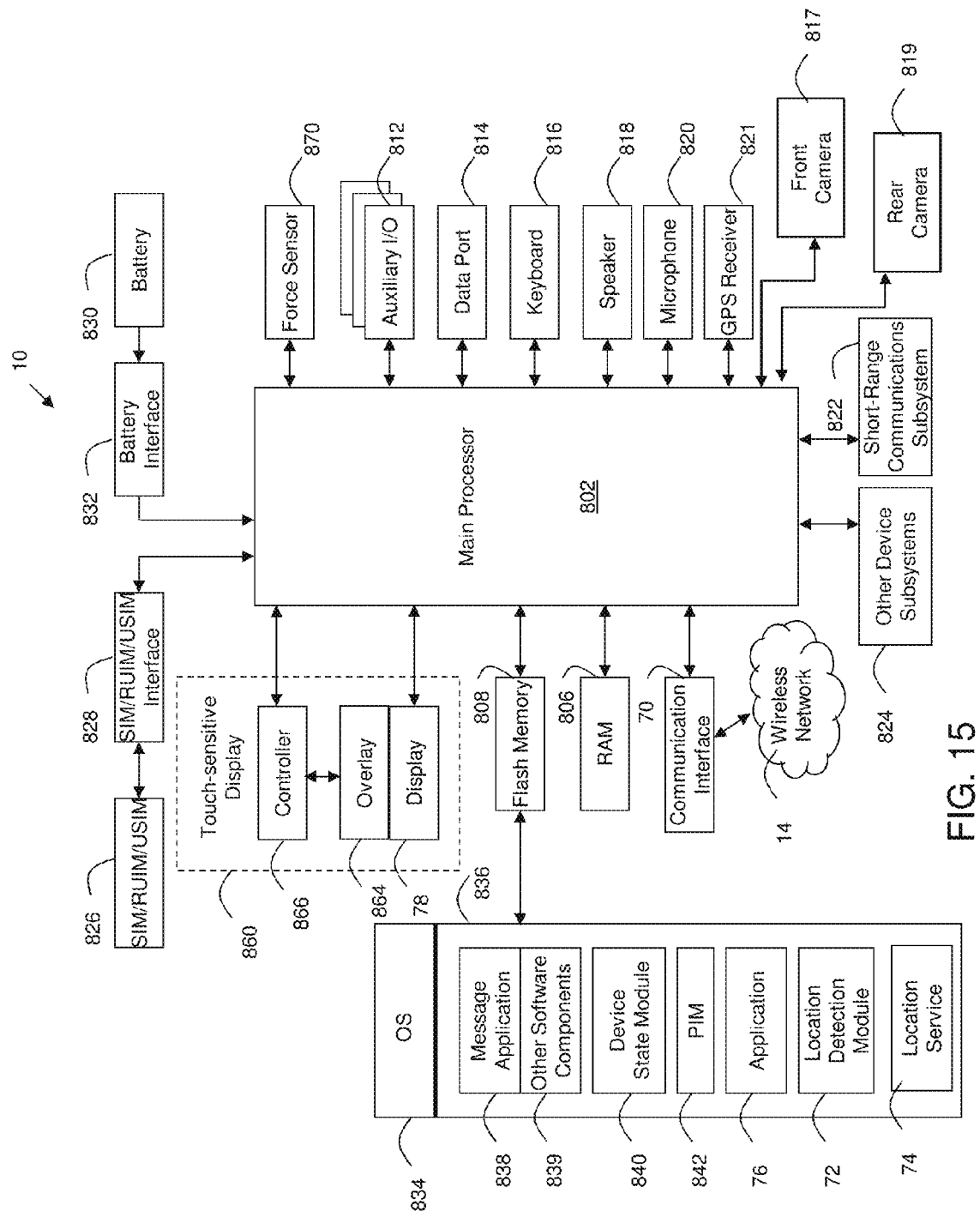
FIG. 15 is block diagram illustrating an example of a configuration for a mobile communication device.

Referring to FIG. 15, to further aid in the understanding of the example mobile devices 10 described above, shown therein is a block diagram of an example configuration of a device configured as a "mobile device", referred to generally as "mobile device 10". The mobile device 10 includes a number of components such as a main processor 802 that controls the overall operation of the mobile device 10. Communication functions, including data and voice communications, are performed through at least one communication interface 70. The communication interface 70 receives messages from and sends messages to a wireless network 14. In this example of the mobile device 10, the communication interface 70 is configured in accordance with the Global System for Mobile Communication (GSM) and General Packet Radio Services (GPRS) standards, which is used worldwide. Other communication configurations that are equally applicable are the 3G and 4G networks such as Enhanced Data-rates for Global Evolution (EDGE), Universal Mobile Telecommunications System (UMTS) and High-Speed Downlink Packet Access (HSDPA), Long Term Evolution (LTE), Worldwide Interoperability for Microwave Access (Wi-Max), etc. New standards are still being defined, but it is believed that they will have similarities to the network behavior described herein, and it will also be understood by persons skilled in the art that the examples described herein are intended to use any other suitable standards that are developed in the future. The wireless link connecting the communication interface 70 with the wireless network 14 represents one or more different Radio Frequency (RF) channels, operating according to defined protocols specified for GSM/GPRS communications.

The main processor 802 also interacts with additional subsystems such as a Random Access Memory (RAM) 806, a flash memory 808, a touch-sensitive display 860, an auxiliary input/output (I/O) subsystem 812, a data port 814, a keyboard 816 (physical, virtual, or both), a speaker 818, a microphone 820, a GPS receiver 821, a front camera 817, a rear camera 819, short-range communications subsystem 822, and other device subsystems 824. Some of the subsystems of the mobile device 10 perform communication-related functions, whereas other subsystems may provide "resident" or on-device functions. By way of example, the touch-sensitive display 860 and the keyboard 816 may be used for both communication-related functions, such as entering a text message for transmission over the wireless network 14, and device-resident functions such as a calculator or task list. In one example, the mobile device 10 can include a non-touch-sensitive display in place of, or in addition to the touch-sensitive display 860. For example the touch-sensitive display 860 can be replaced by a display 78 that may not have touch-sensitive capabilities.

The mobile device 10 can send and receive communication signals over the wireless network 14 after required network registration or activation procedures have been completed. Network access is associated with a subscriber or user of the mobile device 10. To identify a subscriber, the mobile device 10 may use a subscriber module component or "smart card" 826, such as a Subscriber Identity Module (SIM), a Removable User Identity Module (RUIM) and a Universal Subscriber Identity Module (USIM). In the example shown, a SIM/RUIM/USIM 826 is to be inserted into a SIM/RUIM/USIM interface 828 in order to communicate with a network.

The mobile device 10 is typically a battery-powered device and includes a battery interface 832 for receiving one or more rechargeable batteries 830. In at least some examples, the battery 830 can be a smart battery with an embedded microprocessor. The battery interface 832 is coupled to a regulator (not shown), which assists the battery 830 in providing power to the mobile device 10. Although current technology makes use of a battery, future technologies such as micro fuel cells may provide the power to the mobile device 10.

The mobile device 10 also includes an operating system 834 and software components 836 to 842, 32, 50 and 38. The operating system 834 and the software components 836 to 842, 32, 50 and 38, that are executed by the main processor 802 are typically stored in a persistent store such as the flash memory 808, which may alternatively be a read-only memory (ROM) or similar storage element (not shown). Those skilled in the art will appreciate that portions of the operating system 834 and the software components 836 to 842, 76, 72 and 74, such as specific device applications, or parts thereof, may be temporarily loaded into a volatile store such as the RAM 806. Other software components can also be included, as is well known to those skilled in the art.

The subset of software applications 836 that control basic device operations, including data and voice communication applications, may be installed on the mobile device 10 during its manufacture. Software applications may include a message application 838, a device state module 840, a Personal Information Manager (PIM) 842, an application 76, a location detection module 72, and a location service 74. A message application 838 can be any suitable software program that allows a user of the mobile device 10 to send and receive electronic messages, wherein messages are typically stored in the flash memory 808 of the mobile device 10. A device state module 840 provides persistence, i.e. the device state module 840 ensures that important device data is stored in persistent memory, such as the flash memory 808, so that the data is not lost when the mobile device 10 is turned off or loses power. A PIM 842 includes functionality for organizing and managing data items of interest to the user, such as, but not limited to, e-mail, contacts, calendar events, and voice mails, and may interact with the wireless network 14.

Other types of software applications or components 839 can also be installed on the mobile device 10. These software applications 839 can be pre-installed applications (i.e. other than message application 838) or third party applications, which are added after the manufacture of the mobile device 10. Examples of third party applications include games, calculators, utilities, etc.

The additional applications 839 can be loaded onto the mobile device 10 through at least one of the wireless network 16', the auxiliary I/O subsystem 812, the data port 814, the short-range communications subsystem 822, or any other suitable device subsystem 824.

The data port 814 can be any suitable port that enables data communication between the mobile device 10 and another computing device. The data port 814 can be a serial or a parallel port. In some instances, the data port 814 can be a Universal Serial Bus (USB) port that includes data lines for data transfer and a supply line that can provide a charging current to charge the battery 830 of the mobile device 10.

For voice communications, received signals are output to the speaker 818, and signals for transmission are generated by the microphone 820. Although voice or audio signal output is accomplished primarily through the speaker 818, the display 78 can also be used to provide additional information such as the identity of a calling party, duration of a voice call, or other voice call related information.

The touch-sensitive display 860 may be any suitable touch-sensitive display, such as a capacitive, resistive, infrared, surface acoustic wave (SAW) touch-sensitive display, strain gauge, optical imaging, dispersive signal technology, acoustic pulse recognition, and so forth, as known in the art. In the presently described example, the touch-sensitive display 860 is a capacitive touch-sensitive display which includes a capacitive touch-sensitive overlay 864. The overlay 864 may be an assembly of multiple layers in a stack which may include, for example, a substrate, a ground shield layer, a barrier layer, one or more capacitive touch sensor layers separated by a substrate or other barrier, and a cover. The capacitive touch sensor layers may be any suitable material, such as patterned indium tin oxide (ITO).

The display 78 of the touch-sensitive display 860 may include a display area in which information may be displayed, and a non-display area extending around the periphery of the display area. Information is not displayed in the non-display area, which is utilized to accommodate, for example, one or more of electronic traces or electrical connections, adhesives or other sealants, and protective coatings, around the edges of the display area.

One or more touches, also known as touch contacts or touch events, may be detected by the touch-sensitive display 860. The processor 802 may determine attributes of the touch, including a location of a touch. Touch location data may include an area of contact or a single point of contact, such as a point at or near a center of the area of contact, known as the centroid. A signal is provided to the controller 866 in response to detection of a touch. A touch may be detected from any suitable object, such as a finger, thumb, appendage, or other items, for example, a stylus, pen, or other pointer, depending on the nature of the touch-sensitive display 860. The location of the touch moves as the detected object moves during a touch. One or both of the controller 866 and the processor 802 may detect a touch by any suitable contact member on the touch-sensitive display 860. Similarly, multiple simultaneous touches, are detected.

In some examples, an optional force sensor 870 or force sensors is disposed in any suitable location, for example, between the touch-sensitive display 860 and a back of the mobile device 10 to detect a force imparted by a touch on the touch-sensitive display 860. The force sensor 870 may be a force-sensitive resistor, strain gauge, piezoelectric or piezoresistive device, pressure sensor, or other suitable device.

It will be appreciated that any module or component exemplified herein that executes instructions may include or otherwise have access to computer readable media (including non-transitory computer readable media) such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the mobile device 10, interest graph service 12, any component of or related to these entities, etc., or accessible or connectable thereto. Any application or module herein described may be implemented using computer readable/executable instructions that may be stored or otherwise held by such computer readable media.

The steps or operations in the flow charts and diagrams described herein are just for example. There may be many variations to these steps or operations without departing from the principles discussed above. For instance, the steps may be performed in a differing order, or steps may be added, deleted, or modified.

Although the above principles have been described with reference to certain specific examples, various modifications thereof will be apparent to those skilled in the art as outlined in the appended claims.

The invention claimed is:

1. A method of determining interests from location data, the method comprising:
   receiving location data from a mobile device;
   using the location data to determine a uniform resource locator associated with a point of interest;
   determining classification data associated with the uniform resource locator;
   determining that the uniform resource locator is of a predetermined type;
   in response to the uniform resource locator being of the predetermined type, obtaining a set of information associated with at least one attribute of the point of interest based on a web-based search; and
   updating an interest graph associated with the mobile device using the classification data and the set of information.

2. The method of claim 1, wherein the location data is used to find the uniform resource locator by searching in a point of interest database.

3. The method of claim 1, wherein the location data is used to find the uniform resource locator by performing an external search query.

4. The method of claim 1, wherein the classification data is obtained from a classification database.

5. The method of claim 1, wherein the classification data is obtained by performing a classification prediction for the uniform resource locator.

6. The method of claim 5, further comprising updating a classification database using results of the classification prediction.

7. The method of claim 1, further comprising subsequently using the updated interest graph.

8. The method of claim 7, wherein the updated interest graph is used to provide a recommendation or suggestion to the mobile device.

9. The method of claim 1, further comprising providing a recommendation or suggestion to the mobile device in association with the point of interest.

10. The method of claim 1, wherein the classification data provides one or more taxonomies for classifying uniform resource locators.

11. A method comprising:
    receiving location data from a mobile device;
    using the location data to determine a uniform resource locator associated with a point of interest;
    determining classification data associated with the uniform resource locator;
    determining that the uniform resource locator is of a predetermined type;
    in response to the uniform resource locator being of the predetermined type, obtaining a set of information associated with at least one attribute of the point of interest based on a web-based search and
    using the classification data and the set of information to provide information to the mobile device in association with the point of interest.

12. The method of claim 11, further comprising obtaining an interest graph associated with the mobile device, and using the interest graph to determine the information provided to the mobile device.

13. A non-transitory computer readable medium comprising computer executable instructions for:
    receiving information in association with a point of interest associated with a mobile device, the uniform resource locator being associated with a point of interest determined from location data provided by the mobile device, the information based on classification data associated with a uniform resource locator and a set of information associated with at least one attribute of the point of interest, the information obtained based on a web-based search corresponding to the at least one attribute and performed in response to determining that the uniform resource locator is of a predetermined type; and
    displaying the information.

14. The non-transitory computer readable medium of claim 13, wherein the information comprises a notification.

15. The non-transitory computer readable medium of claim 14, further comprising displaying a recommendation or suggestion associated with the point of interest after detecting selection of the notification.

16. The non-transitory computer readable medium of claim 13, wherein the information comprises a recommendation or suggestion associated with the point of interest.

17. A mobile device comprising:
    a display;
    at least one processor; and
    at least one memory, the at least one memory comprising computer executable instructions that when executed by the at least one processor operate the mobile device to:
    receive information in association with a point of interest associated with a mobile device, the uniform resource locator being associated with a point of interest determined from location data provided by the mobile device, the information based on classification data associated with a uniform resource locator and a set of information associated with at least one attribute of the point of interest, the information obtained based on a web-based search corresponding to the at least one attribute and performed in response to determining that the uniform resource locator is of a predetermined type; and
    display the information.

18. The mobile device of claim 17, wherein the information comprises a notification.

19. The mobile device of claim 18, further comprising instructions for displaying a recommendation or suggestion associated with the point of interest after detecting selection of the notification.

20. The mobile device of claim 17, wherein the information comprises a recommendation or suggestion associated with the point of interest.

* * * * *